(12) United States Patent
Bauer et al.

(10) Patent No.: US 10,526,946 B2
(45) Date of Patent: Jan. 7, 2020

(54) DEVICE FOR PROVIDING A LIQUID ADDITIVE, AND METHOD FOR HEATING THE ADDITIVE

(71) Applicant: CONTINENTAL AUTOMOTIVE GMBH, Hannover (DE)

(72) Inventors: Peter Bauer, Siegburg (DE); Finn Frederiksen, Hals (DK); Thomas Tarp Hansen, Hobro (DK)

(73) Assignee: Continental Automotive GmbH, Hannover (DE)

( * ) Notice: Subject to any disclaimer, the term of this patent is extended or adjusted under 35 U.S.C. 154(b) by 700 days.

(21) Appl. No.: 14/440,935

(22) PCT Filed: Oct. 23, 2013

(86) PCT No.: PCT/EP2013/072141
§ 371 (c)(1),
(2) Date: May 6, 2015

(87) PCT Pub. No.: WO2014/072176
PCT Pub. Date: May 15, 2014

(65) Prior Publication Data
US 2015/0285119 A1    Oct. 8, 2015

(30) Foreign Application Priority Data

Nov. 6, 2012  (DE) .......................... 10 2012 110 585

(51) Int. Cl.
*F01N 3/20*    (2006.01)

(52) U.S. Cl.
CPC ........ *F01N 3/2066* (2013.01); *F01N 2610/02* (2013.01); *F01N 2610/10* (2013.01);
(Continued)

(58) Field of Classification Search
CPC ............. F01N 2610/10; F01N 2610/02; F01N 3/2066; F01N 2610/1406; F01N 3/208;
(Continued)

(56) References Cited

U.S. PATENT DOCUMENTS

| 5,189,991 A * | 3/1993 | Humburg ............ F16K 31/0675 123/41.1 |
| 8,357,332 B2 | 1/2013 | Brück et al. |

(Continued)

FOREIGN PATENT DOCUMENTS

| DE | 102004050763 A1 | 4/2006 |
| DE | 102005049779 A1 | 4/2007 |

(Continued)

*Primary Examiner* — Ibrahime A Abraham
*Assistant Examiner* — Chris Q Liu
(74) *Attorney, Agent, or Firm* — Laurence A. Greenberg; Werner H. Stemer; Ralph E. Locher

(57) ABSTRACT

A device for providing a liquid additive into an exhaust line includes a tank, a delivery line, a heating element formed of a posistor or PTC material for heating the additive in the tank and/or the delivery line, and a dosing device or doser for dosing the liquid additive. The dosing device has a coil and a movable component and the movable component can be moved by the coil. The coil can be connected electronically in series with the heating element by a first switching element. It is thus possible for an activation current through a heating element formed of a posistor material to be limited in magnitude in an inexpensive manner.

4 Claims, 3 Drawing Sheets

(52) U.S. Cl.
CPC .............................. *F01N 2610/105* (2013.01);
*F01N 2610/1406* (2013.01); *F01N 2900/1811*
(2013.01); *Y02T 10/24* (2013.01)

(58) Field of Classification Search
CPC ............... F01N 13/16; F01N 2610/105; F01N
2610/144; F01N 2610/14; F01N
2610/1426; F01N 2610/146; F01N
2610/1473; F01N 2900/1811; F01N
2900/1806; F01N 2900/1814; F01N 3/00;
F01N 3/206; F01N 3/08; H05B 2203/02;
H05B 3/40
USPC ....... 219/201, 441, 494, 497, 501, 506, 542,
219/549; 392/441, 386; 137/561, 571, 3,
137/87.02; 123/41.1, 1 A
See application file for complete search history.

(56) References Cited

U.S. PATENT DOCUMENTS

| | | |
|---|---|---|
| 9,038,374 B2 | 5/2015 | Brück et al. |
| 2010/0064668 A1 | 3/2010 | Beckmann et al. |
| 2010/0107615 A1* | 5/2010 | Chmielewski ........ F01N 3/2066 60/303 |
| 2011/0155742 A1 | 6/2011 | Garcia-Lorenzana et al. |
| 2012/0268219 A1* | 10/2012 | Czimmek ............ H03B 5/1228 331/117 FE |
| 2013/0129330 A1 | 5/2013 | Emaille et al. |
| 2013/0340409 A1 | 12/2013 | Hodgson et al. |

FOREIGN PATENT DOCUMENTS

| | | | |
|---|---|---|---|
| DE | 102005060127 A1 | 6/2007 | |
| DE | 102006051724 A1 | 5/2008 | |
| DE | 102007017458 A1 | 10/2008 | |
| DE | 102010038361 A1 | 1/2012 | |
| DE | 102011012441 A1 | 8/2012 | |
| DE | 102011006105 A1 | 9/2012 | |
| EP | 2339138 A1 | 6/2011 | |
| FR | 2959497 A1 | 11/2011 | |
| RU | 2451539 C2 | 5/2012 | |
| WO | WO-2010035355 A1 * | 4/2010 | ............ F01N 3/208 |
| WO | 2011029774 A1 | 3/2011 | |

* cited by examiner

DEVICE FOR PROVIDING A LIQUID ADDITIVE, AND METHOD FOR HEATING THE ADDITIVE

BACKGROUND OF THE INVENTION

Field of the Invention

The present invention relates to a device for providing a liquid additive into an exhaust line and to a method for heating the additive in the device. The invention is used in particular in a motor vehicle which is provided with a tank for storing the liquid additive.

The use of exhaust-gas aftertreatment methods in which liquid additive is added to the exhaust gas is considered to be known. The aim of such methods is in particular for the pollutants contained in the exhaust gas to be converted in a manner as complete and efficient as possible.

For example, it is known for an oxidant (for example fuel or hydrocarbons) to be supplied to the exhaust gas. Said additive may be used to directly react with constituents in the exhaust gas and thus convert pollutants. It is however also possible for said oxidant to be used to alter ambient conditions in the exhaust system to a desired state suitable for the conversion of pollutants. Fuel or hydrocarbons may for example be supplied to an oxidation catalytic converter, wherein the temperature of the exhaust gas in the exhaust system can be increased considerably owing to an exothermic reaction in the oxidation catalytic converter. This is used in particular for the regeneration of a diesel particle filter.

Furthermore, it is known for a reducing agent to be supplied to the exhaust gas. Even though it is basically possible for solid or gaseous reducing agents to be introduced into the exhaust system, delivery systems and dosing systems which provide a supply of the reducing agent in liquid form have proven to be particularly suitable. For example, the method of selective catalytic reduction (SCR) is known. Here, the nitrogen oxide compounds in the exhaust gas are converted with the aid of the reducing agent. For this purpose, use is made in particular of ammonia or substances that form ammonia. An already widely used reducing agent for this purpose is urea-water solution. A 32.5% urea-water solution is known under the trade name AdBlue®. Said liquid additive is then initially admixed to the exhaust gas and subsequently conducted across a suitable catalytic converter in which (inter alia) the desired chemical conversion then takes place.

Since it is for example the case that the liquid additive such as urea-water solution freezes at temperatures of around −11° C., heating systems have been proposed which are intended to effect a rapid thawing of the liquid additive in the tank and/or in a connected delivery line. The intention of this is to make the desired exhaust-gas purification method available already a short time after the engine of a motor vehicle is started, and/or to prevent damage to the components required for the storage, delivery and/or metering of the liquid additive.

In this technical field, as heating devices, there have already been proposed liquid-type heaters (for example heat exchangers that interact with the engine cooling system), electric heaters, radiation heaters and combinations of these. It has however not yet been possible to satisfactorily achieve the most rapid possible heating, and if appropriate also most uniform possible heating, in the vessel. In particular, the proposed systems for heating the vessel are technically cumbersome, expensive and/or difficult to regulate or control. In the case of said heating devices, there is the risk of the additive being heated to above a critical temperature. For example, in the case of AdBlue®, constituents thereof can crystallize above 65° C., which increases the risk of undesired deposits and blockages.

It is also known for the heating device to have a single electrically operable heating element. An electrically operable heating element can likewise be activated and deactivated at predefined points in time. Such heating is realized for example on the basis of ohmic resistance heating. A known electrically operable heating element which is particularly preferably used is a so-called posistor or PTC (positive temperature coefficient) heating element. A posistor or PTC heating element comprises a material whose electrical resistance increases with rising temperature.

In the case of such devices having a posistor as a heating element, after activation by the application of a constant voltage, a current peak occurs owing to the initially low resistance. There is thus an intense increase in current through the posistor upon activation. During further operation, the posistor warms up owing to ohmic heat, and thus the electrical resistance of the posistor also changes. In a temperature range in which the electrical resistance of the posistor changes intensely even with small changes in temperature, the current through the posistor then assumes a constant level. After a certain amount of time, when a characteristic temperature has been reached, it is thus the case that a virtually constant current (in the case of constant voltage) flows through the posistor, wherein the value of the characteristic temperature is dependent on the characteristics of the posistor. All current-conducting elements and also in particular all connecting points of the current-conducting elements must be designed for the maximum current intensity of the current peak. Furthermore, the current peak can result in an electrical transient fault which could influence the electronics of the motor vehicle. It is therefore desirable to keep the current peak as low as possible.

BRIEF SUMMARY OF THE INVENTION

It is therefore an object of the present invention to at least partially alleviate the problems highlighted with regard to the prior art. It is sought in particular to specify a device for providing a liquid additive into an exhaust line, in which the activation current through a heating element formed from a posistor is limited in an inexpensive manner. Furthermore, it is sought to specify a method for heating the additive in the device, in which method only an activation current which is limited in magnitude flows.

Said object is achieved by means of a device and a method according to the features of the independent claims. Advantageous embodiments of the device and of the method are specified in the dependent claims. The embodiments will be described in more detail in the description.

Said objects are achieved in particular by means of a device for providing a liquid additive into an exhaust line, comprising a tank, a delivery line, a heating element, formed from a posistor, for heating the additive in the tank and/or the delivery line, and a dosing device for dosing the liquid additive, the dosing device having a coil and having a movable component, wherein the movable component can be moved by means of the coil, and the coil can be connected electronically in series with the heating element by means of a first switching element.

The liquid additive is in particular a reducing agent, preferably a urea-water solution.

The tank is in particular a tank for storing a reducing agent, in particular urea-water solution. Said tank could nevertheless also be used for oxidants and other liquid additives. The tank may be formed from plastic. In any case, the tank should be durable and designed for storing the liquid additive on a sustained basis. The additive is stored in the tank and delivered to the exhaust line via the delivery line.

The heating element is in particular formed in and/or on the tank. Alternatively or in addition, the heating element is formed in and/or on the delivery line. If the additive has solidified owing to low temperatures or is close to solidifying owing to low temperatures, the temperature of the additive in the tank and/or in the delivery line can be increased by means of the heating element, such that said additive changes to the liquid state or remains in the liquid state.

A posistor, also referred to as a PTC (positive temperature coefficient) element, is a material whose electrical resistance increases with rising temperature. The posistor thus has a positive temperature coefficient. When a constant voltage is applied, the posistor operates in a self-regulating manner about a setpoint temperature. As a posistor, use is for example made of ceramic materials such as, for example, barium titanate ceramics and/or doped polymers.

The heating element is preferably designed such that, when a constant voltage of 12, 24 or 48 V is applied, a constant current is generated, with which the heating element regulates to a temperature of at least 10° C., preferably at least 50° C.

The expression "dosing device for dosing the liquid additive" should be understood to encompass all elements of the device that deliver the additive, for example a pump, and those that can restrict the flow of the additive in the delivery line, for example a valve. The dosing device comprises a coil or an inductive element which, owing to a current flow generated therein and the magnetic field thereby generated, exert an electromagnetic force on the movable component. The movable component is in particular a magnetic element which is set in motion owing to the electromagnetic force generated by the coil. In the case of a pump, this may for example be a rod that moves a diaphragm. In the case of a valve, this is preferably the valve needle itself.

The present invention now proposes that, in particular during the activation process of the heating element, the coil be connected electronically in series with the heating element by means of a first switching element. As switching elements, use may be made in particular of all known switching element such as transistors, preferably MOSFETs. During the activation of the heating element, the current thus flows both through the coil and also through the heating element. Owing to the inductive action of the coil, the current intensity of the current peak is greatly reduced during activation. It is thus also possible for all further components of the device through which the current flows, in particular electrical contacts and/or lines, to be designed for a lower current intensity. Furthermore, an electrical transient fault of further electronic components is reduced.

Coils as inductive components for filtering high frequencies or for limiting rapid current fluctuations are already known, but said components have hitherto been used as passive components. In general, coils as impedances are generally provided as separate components in circuits. The present invention teaches, for the first time, the use of an active coil for limiting the activation current of a heating element in a device for providing a liquid additive.

According to one advantageous refinement of the device, said device comprises a control device having the first switching element, which is connected electronically in series with the coil and with the heating element, and having a second switching element which is connected in parallel with the first switching element and with the coil and in series with the heating element. The control device is preferably formed spatially separately from the dosing device.

By means of the second switching element, it is thus possible for the first switching element and the coil to be bypassed, such that the heating element can be operated independently of the switching position of the first switching element. This is expedient in particular when the heating element has reached its operating temperature and the heating element is to be operated continuously. In this case, it is therefore possible for the coil and thus the dosing device to be operated independently of the heating element.

In particular if the second switching element is closed at the same time, the coil can be energized via a third switching element. It is thus possible, after the activation process of the heating element, for the coil and thus the dosing device to be operated independently of the heating element by virtue of the third switching element being opened and closed.

According to a further aspect of the invention, there is proposed a method for heating an additive in a device according to the invention, comprising the following steps:
determining a temperature of the additive,
comparing the determined temperature with a first predefinable value,
activating the heating element if the determined temperature is lower than the first predefinable value, by virtue of the coil being connected electronically in series with the heating element by means of a first switching element.

BRIEF DESCRIPTION OF THE SEVERAL VIEWS OF THE DRAWING

For the determination of the temperature of the additive, the temperature may be measured directly by means of a temperature sensor. The temperature of the additive may however also be determined by measurement of a temperature at some other location of the device or of the motor vehicle, wherein the temperature of the additive can thereby be inferred. The first predefinable value is in particular the freezing temperature of the additive or a value at least 2° C., preferably at least 5° C. higher than the freezing temperature of the additive. In this way, the heating element is activated while the additive is freezing or when the additive has already frozen. The activation of the heating element takes place by virtue of the heating element being connected electronically in series with the coil of the dosing device. The current intensity of the current peak is limited in magnitude by the inductivity of the coil.

DESCRIPTION OF THE INVENTION

Figure 1:
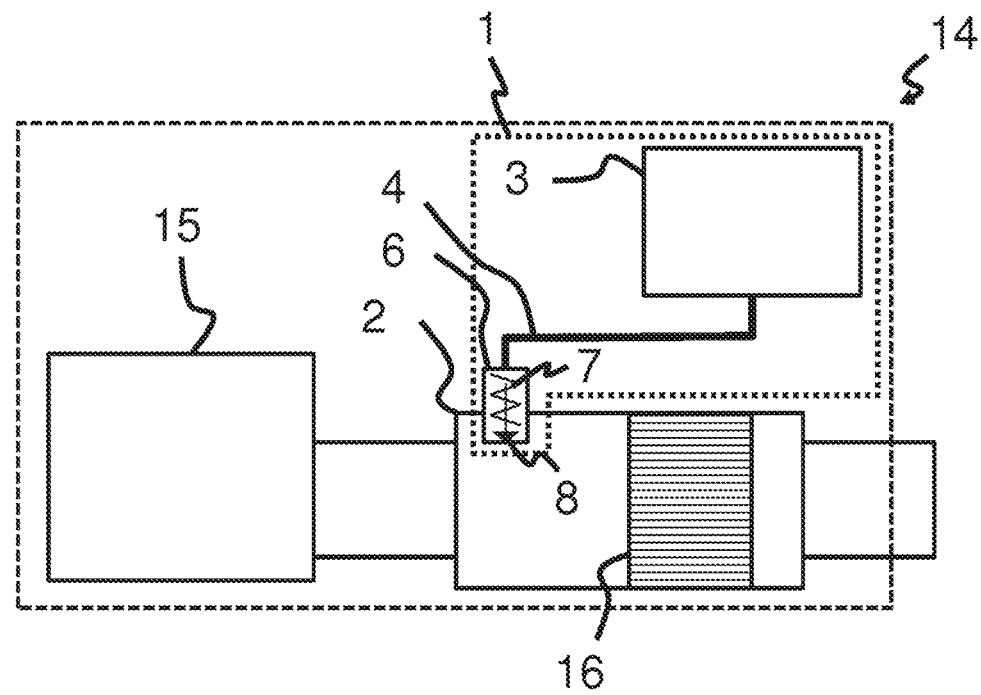

It is advantageous if the heating element is directly connected to a voltage source by virtue of the coil being connected in parallel with the heating element by means of a second switching element and a third switching element.

Said connection in parallel preferably takes place after the activation of the heating element. It is thus possible for the heating element and the coil to be operated independently of one another when the heating element has reached its operating temperature.

According to a further aspect of the invention, there is proposed a motor vehicle having an internal combustion engine and having an exhaust line, which motor vehicle comprises a device according to the invention and is set up and designed to carry out the method according to the invention.

The statements made with regard to the device can be transferred and applied to the method and vice versa.

Figure 2:
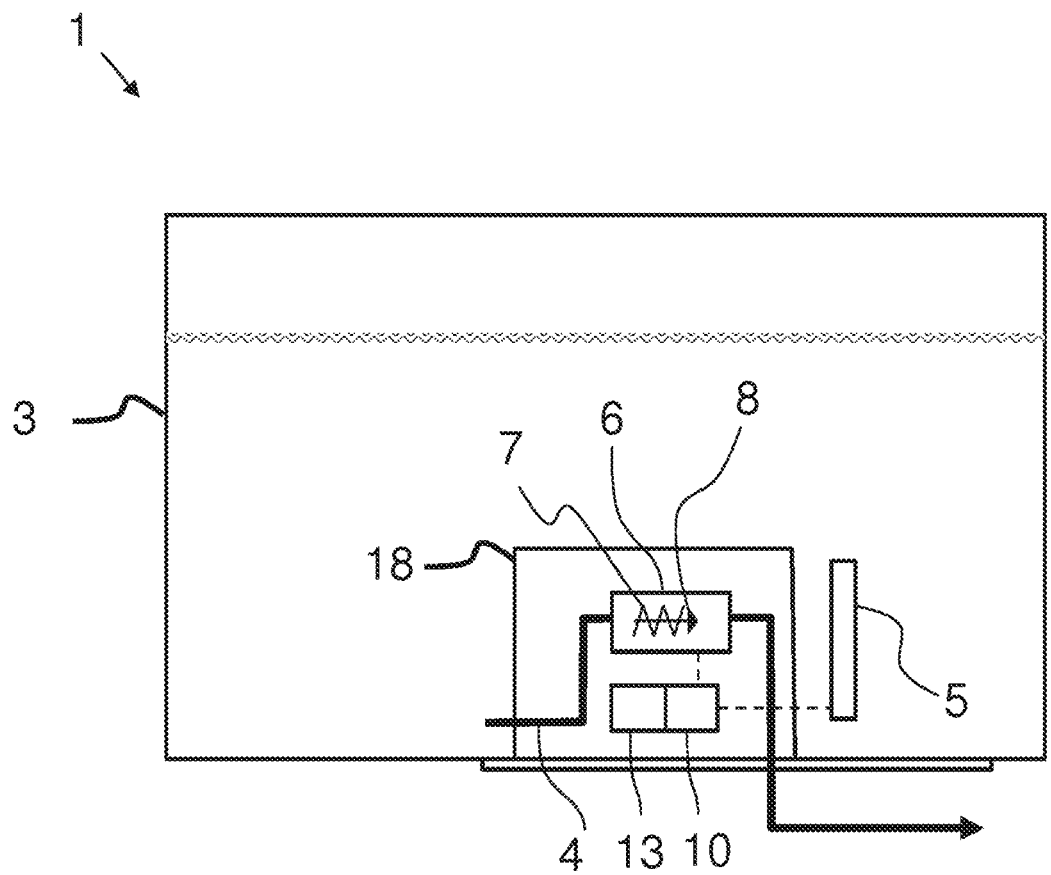
Figure 3:
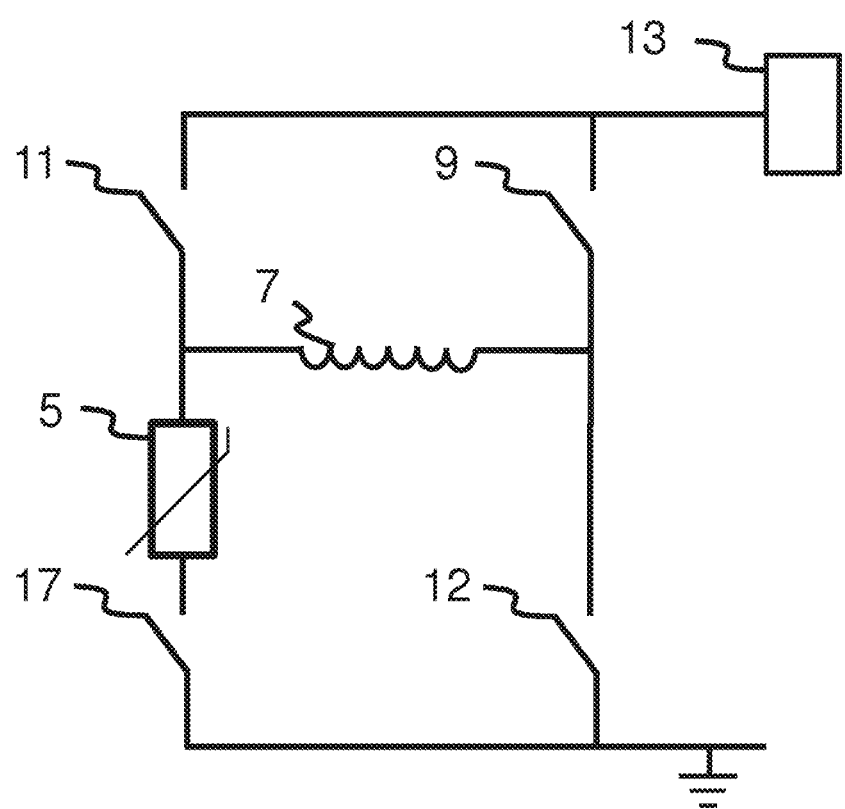

The invention and the technical field will be explained in more detail below on the basis of the figures. It should be noted that the embodiment variants illustrated in the drawings are not intended to restrict the invention. In particular, the features presented and explained jointly in the figures may also be considered separately from one another and/or combined with other (individual) features of other figures as long as this is technically possible, or as long as the text below does not explicitly specify that features imperatively belong together. Accordingly, there emerges to a person skilled in the art a multiplicity of possible combinations of the invention illustrated schematically and by way of example in the figures. In the figures, in each case schematically:

FIG. 1: shows a motor vehicle having a device for providing a liquid additive,

FIG. 2: shows a device for providing a liquid additive,

FIG. 3: shows a circuit diagram for an embodiment of a device according to the invention.

FIG. 1 schematically shows a motor vehicle 14 having an internal combustion engine 15 to which an exhaust line 2 is connected. A catalytic converter 16 is formed in the exhaust line 2. Upstream of the catalytic converter 16, a liquid additive can be introduced into the exhaust gas by means of a device 1. The device 1 comprises a tank 3 which is connected in terms of flow via a delivery line 4 to a dosing device 6 for dosing the additive. The dosing device 6 in the illustrated exemplary embodiment is a valve which comprises a coil 7 and a movable component 8, in this case a valve needle. During operation of the motor vehicle 14, liquid additive can be delivered into the exhaust line 2 by means of the device 1.

FIG. 2 schematically shows a device 1 having a tank 3. In the tank 3 there is formed a vessel 18 in which, in turn, there is arranged a dosing device 6 for the dosing of liquid additive. The dosing device 6 is in this case realized in the form of a pump. The dosing device 6 (pump) comprises a coil 7 and a movable component 8 for actuating the pump. The dosing device 6 is connected to a delivery line 4 through which the additive is delivered out of the tank 3 via the dosing device 6 to an exhaust line 2 (not illustrated). A heating element 5 formed from a posistor is also arranged in the tank 3. The heating element 5 may additionally or alternatively also be arranged in the wall of the tank 3. The dosing device 6 and the heating element 5 are connected to a control device 10 which in turn is connected to a voltage source 13. By means of a heating element 5, the additive in the tank 3 can be kept in a liquid state or changed to a liquid state.

A circuit diagram of a device 1 is illustrated in FIG. 3. The circuit comprises a voltage source 13, a first switching element 9, a second switching element 11, a third switching element 12 and a fourth switching element 17, a coil 7 of a dosing device 6, and a heating element 5. The heating element 5 can be connected in series with the coil 7, or connected in parallel therewith, depending on the position of the switching elements 9, 11, 12, 17.

When the fourth switching element 17 is closed, the coil 7 can be connected in series with the heating element 5 by virtue of the first switching element 9 being closed. A current thus flows both through the coil 7 and also through the heating element 5, which is advantageous in particular during the activation of the heating element 5, because the peak current is thereby limited in magnitude.

When the heating element 5 is at operating temperature, the heating element 5 can be operated in parallel with the coil 7 by virtue of the second switching element 11 being closed and the first switching element 9 being opened. In this case, the coil 7 and the heating element 5 can be activated and deactivated independently of one another by means of the third switching element 12 and the fourth switching element 17.

The third switching element 12 and the fourth switching element 17 may be used to operate the coil 7 with pulse width modulation of the current.

By means of the present inventions, it is possible in an inexpensive manner for the activation current through a heating element 5 composed of a posistor material to be limited in magnitude.

LIST OF REFERENCE NUMERALS

1 Device
2 Exhaust line
3 Tank
4 Delivery line
5 Heating element
6 Dosing device
7 Coil
8 Movable component
9 First switching element
10 Control device
11 Second switching element
12 Third switching element
13 Voltage source
14 Motor vehicle
15 Internal combustion engine
16 Catalytic converter
17 Fourth switching element
18 Vessel

The invention claimed is:

1. A device for providing a liquid additive into an exhaust line for an engine, the device comprising:
   a tank;
   a delivery line connected to said tank;
   a heating element formed of a posistor for heating the additive in at least one of said tank or said delivery;
   at least one of:
      a pump connected to said delivery line for dosing the liquid additive, said pump having a coil and a rod movable by an electromagnetic force generated by said coil to move a diaphragm and deliver liquid additive to said delivery line; or
      a valve connected to said delivery line for dosing the liquid additive, said valve having a coil and a valve stem movable by an electromagnetic force generated by said coil to deliver liquid additive to said delivery line; and
   a first switch configured to selectively connect said coil electronically in series with said heating element such that current passing through said coil is provided to and through said heating element to activate said heating element, said coil being an inductive element configured to generate a magnetic field exerted on said rod or said valve stem in response to current flow through said coil when said first switch connects said coil electronically in series with said heating element.

2. The device according to claim 1, which further comprises a control device having:

said first switch connected electronically in series with said coil and with said heating element, and a second switch connected in parallel with said first switch and with said coil and connected in series with said heating element.

3. The device according to claim 2, wherein said control device includes a third switch for energizing said coil when said first switch is open and said second switch is closed.

4. A device for providing a liquid additive into an exhaust line for an engine, the device comprising:

a tank;

a delivery line connected to said tank;

a heating element formed of a posistor for heating the additive in at least one of said tank or said delivery line;

at least one of:

a pump connected to said delivery line for dosing the liquid additive, said pump having a coil and a rod movable by an electromagnetic force generated by said coil to move a diaphragm and deliver liquid additive to said delivery line; or a valve connected to said delivery line for dosing the liquid additive, said valve having a coil and a valve stem movable by an electromagnetic force generated by said coil to deliver liquid additive to said delivery line; and a first switch configured to selectively connect said coil electronically in series with said heating element such that current passing through said coil is provided to and through said heating element to activate said heating element, said coil arranged, when through said heating element, said coil being an inductive element configured to generate a magnetic field exerted on said rod or valve stem in response to current flow through said coil when said first switch connects said coil electronically in series with said heating element.

* * * * *